United States Patent
Wang et al.

(10) Patent No.: US 11,193,867 B2
(45) Date of Patent: Dec. 7, 2021

(54) SYSTEM AND METHOD FOR HIGH-THROUGHPUT TEST OF MECHANICAL PROPERTIES OF MINIATURE SPECIMENS

(71) Applicant: The NCS Testing Technology Co., Ltd., Beijing (CN)

(72) Inventors: Guiyong Wang, Beijing (CN); Haizhou Wang, Beijing (CN); Linmao Zhu, Beijing (CN); Zhigang Yang, Beijing (CN); Peng Wang, Beijing (CN); Tiezhu Zhu, Beijing (CN); Lei Zhao, Beijing (CN); Dongling Li, Beijing (CN)

(73) Assignee: THE NCS TESTING TECHNOLOGY CO., LTD., Beijing (CN)

( * ) Notice: Subject to any disclaimer, the term of this patent is extended or adjusted under 35 U.S.C. 154(b) by 128 days.

(21) Appl. No.: 16/835,899

(22) Filed: Mar. 31, 2020

(65) Prior Publication Data

US 2020/0319071 A1    Oct. 8, 2020

(30) Foreign Application Priority Data

Apr. 3, 2019    (CN) .......................... 201910264775.2

(51) Int. Cl.
  *G01N 3/20*    (2006.01)
  *G01N 3/02*    (2006.01)
  (Continued)

(52) U.S. Cl.
  CPC ................. *G01N 3/20* (2013.01); *G01N 3/02* (2013.01); *G01N 3/08* (2013.01); *G01N 3/00* (2013.01);
  (Continued)

(58) Field of Classification Search
  CPC .. G01N 3/20; G01N 3/02; G01N 3/08; G01N 3/00; G01N 2203/0016; G01N 2203/0023;
  (Continued)

(56) References Cited

U.S. PATENT DOCUMENTS 3,491,586 A * 1/1970 Branger ................... G01N 3/32
                                                                    374/47
3,706,222 A * 12/1972 Smith ...................... G01N 3/32
                                                                    73/809

(Continued)

FOREIGN PATENT DOCUMENTS

CN    108982262 A  * 12/2018
CN    109556944 A  *  4/2019

*Primary Examiner* — Jonathan M Dunlap
(74) *Attorney, Agent, or Firm* — Muncy, Geissler, Olds & Lowe , P.C.

(57) ABSTRACT

The present invention relates to a test system and method capable of simultaneously carrying out a high-throughput test of mechanical properties for miniature specimens. The system comprises one workstation (17) and a plurality of specimen test modules (16) installed horizontally or vertically on a workbench (15), wherein the workstation (17) comprises an operation interface, a data processing unit and a load output unit; each specimen test module (16) comprises a drive unit (5), an interchangeable clamp unit (8), a displacement sensor (2), and a load sensor (14); the workstation (17) controls the drive unit (5) of the specimen test module (16) and receives detection data of the displacement sensor (2) and the load sensor (14); each specimen test module (16) optionally performs mechanical property testing independently; and the workstation (17) controls simultaneously started testing of a plurality of specimens (9). The present invention can achieve tensile, bending, compression bending, stress-rupture, relaxation, and fatigue strength tests on a plurality of specimens at the same time.

16 Claims, 2 Drawing Sheets

(51) Int. Cl.
*G01N 3/08* (2006.01)
*G01N 3/00* (2006.01)

(52) U.S. Cl.
CPC .............. *G01N 2203/0016* (2013.01); *G01N 2203/0017* (2013.01); *G01N 2203/0023* (2013.01); *G01N 2203/0075* (2013.01); *G01N 2203/0208* (2013.01); *G01N 2203/0286* (2013.01); *G01N 2203/04* (2013.01); *G01N 2203/0676* (2013.01); *G01N 2203/0682* (2013.01)

(58) Field of Classification Search
CPC ... G01N 2203/0075; G01N 2203/0073; G01N 2203/0208; G01N 2203/0286; G01N 2203/04; G01N 2203/0676; G01N 2203/0682; G01N 2203/0017
See application file for complete search history.

(56) References Cited

U.S. PATENT DOCUMENTS

| | | | | |
|---|---|---|---|---|
| 3,937,071 | A * | 2/1976 | Slota | G01N 3/36 73/809 |
| 4,018,080 | A * | 4/1977 | Fletcher | G01N 3/18 374/50 |
| 4,030,348 | A * | 6/1977 | Fletcher | G01N 3/34 73/809 |
| 4,112,746 | A * | 9/1978 | Itoh | G01N 3/068 73/789 |
| 4,676,110 | A * | 6/1987 | Hodo | G01N 3/36 73/809 |
| 7,975,557 | B2 * | 7/2011 | Hohjo | G01N 3/00 73/799 |
| 8,746,077 | B2 * | 6/2014 | Ozkul | G01M 5/0016 73/810 |
| 9,188,519 | B2 * | 11/2015 | McColskey | G01N 3/08 |

\* cited by examiner

SYSTEM AND METHOD FOR HIGH-THROUGHPUT TEST OF MECHANICAL PROPERTIES OF MINIATURE SPECIMENS

FIELD OF THE INVENTION

The invention relates to the field of tests of mechanical properties of metallic materials and non-metallic materials, in particular to a test system and method capable of simultaneously carrying out a high-throughput test of mechanical properties for miniature specimens; that is, by controlling the system to operate with one click, capable of performing tensile, bending, compression bending, stress-rupture, relaxation, and fatigue strength tests on a plurality of specimens at the same time and obtaining tensile, bending, compression bending, stress-rupture, relaxation, and fatigue test curves and test parameters of the specimens.

BACKGROUND OF THE INVENTION

In the field of materials science, the testing of mechanical properties of materials is a very important task for evaluating properties of materials. Parameters for testing mechanical properties of materials include yield strength, tensile strength, elongation, cold bending property, impact toughness and creep rupture strength etc. Corresponding test equipment includes microcomputer-controlled electronic universal testing machines, electro-hydraulic servo universal testing machines, impact test machines, and creep rupture test machines etc. In the development of materials science, especially in the development of new materials, tests need to be carried out repeatedly in large batches on the materials. Due to limitations of the aforementioned test equipments, it can usually perform testing only on one specimen at a time. Moreover, as the specimen is large in size, the actual sample is destroyed by sampling. Besides, a test period is long, and the test equipment has a unitary function. As a result, it is difficult to meet the multi-parameter, cross-scale, and high-throughput testing requirements for mechanical properties of complex materials during research in the development of new materials and scientific research.

SUMMARY OF THE INVENTION

In view of the above-mentioned technical problems, an objective of the present invention is providing a system and method for a high-throughput test of mechanical properties of miniature specimens, capable of performing tensile, bending, compression bending, stress-rupture, relaxation and fatigue strength tests on a plurality of specimens at the same time and obtaining tensile, bending, compression bending, stress-rupture, relaxation and fatigue test curves and test parameters of the specimens.

To achieve the above object, the present invention provides the following technical solution:

A system for a high-throughput test of mechanical properties of miniature specimens includes one workstation 17 and a plurality of specimen test modules 16 installed horizontally or vertically on a workbench 15.

The workstation 17 includes an operation interface, a data processing unit and a load output unit; each specimen test module 16 includes a drive unit 5, an interchangeable clamp unit 8, a displacement sensor 2, and a load sensor 14; and the workstation 17 is connected to the drive unit 5, the displacement sensor 2 and the load sensor 14 of the specimen test module 16 respectively, controls the drive unit 5 and receives detection data of the displacement sensor 2 and the load sensor 14.

Each specimen test module 16 optionally performs mechanical property testing independently, and specimens 9 in the specimen test modules 16 are same or different specimens; and the workstation 17 controls simultaneously started testing of a plurality of specimens 9.

The specimen test module 16 further includes a base 1, displacement sensor fixing plates 3, a connecting plate 4, a moving end fixing plate 10, a first clamp connecting rod 12, a second clamp connecting rod 18 and a load sensor fixing plate 13.

The moving end fixing plate 10 and the load sensor fixing plate 13 are respectively fixed to the base 1 perpendicularly in such a manner of corresponding to each other and being spaced by a distance from each other.

The drive unit 5 is fixedly connected to an outer end face of the moving end fixing plate 10, and a driving rod of the drive unit 5 passes through the moving end fixing plate 10 and is connected to an outer end face of the connecting plate 4 through a connecting flange 6.

The load sensor 14 is fixedly connected to an outer end face of the load sensor fixing plate 13.

The first clamp connecting rod 12 is fixedly connected to an inner end face of the connecting plate 4; the second clamp connecting rod 18 passes through the load sensor fixing plate 13 from an inner end face of the load sensor fixing plate 13 and is fixedly fixed to the load sensor 14; two clamping parts of the clamp unit 8 are respectively mounted on the first clamp connecting rod 12 and the second clamp connecting rod 18.

The pair of displacement sensor fixing plates 3 are fixedly connected to the inner end face and the outer end face on one side of the connecting plate 4; and the displacement sensor 2 is installed on the two displacement sensor fixing plates 3 along a moving direction of the driving rod of the drive unit 5, and a detection end of the displacement sensor 2 is in contact with the inner end face of the load sensor fixing plate 13.

Mechanical properties to be tested by each test module 16 are selected and/or input through the operation interface of the workstation.

The mechanical property test is one or more selected from tensile, bending, compression bending, stress-rupture, relaxation and fatigue tests.

Working modes of the drive unit 5 include pneumatic driving, hydraulic driving and motor driving.

The displacement sensor 2 is a LVDT linear displacement sensor, a pull wire displacement encoder, or an optical displacement sensor.

Clamp body types of the clamp unit 8 include a bar specimen clamp body, a plate specimen clamp body, a three-point bending clamp body and a compression clamp body.

The load sensor 14 is a spoke-type load sensor or an S-type load sensor.

Two clamping parts of the clamp unit 8 are respectively installed on the first clamp connecting rod 12 and the second clamp connecting rod 18 through mutual cooperation of a clamp pin 7 and a clamp lock nut 11.

The power of each specimen test module 16 is derived from the same workstation 17, and the load output unit of the workstation 17 is one or more selected from a hydraulic station and a control system thereof, an air pump station and a control system thereof, and a servo drive and a control system thereof.

Various control systems in the load output unit of the workstation 17 can achieve displacement control, stress control and strain control.

The specimen size ranges from 1 mm to 60 mm.

A test method using the system for a high-throughput test of mechanical properties of miniature specimens includes steps of:

1) based on the sizes of a plurality of specimens 9 and mechanical properties to be tested, selecting clamp units 8 respectively therefor, and fixing the specimens 9 to the clamp units 8 respectively; and 2) installing the plurality of clamp units 8 on a plurality of specimen test modules 16, and inputting mechanical properties to be tested and test parameters of each specimen test module 16 from the operation interface of the workstation 17, and the workstation 17 controlling simultaneously started testing of the plurality of specimens 9, controlling the drive units 5 of the specimen test modules 16, and receiving detection data of the displacement sensor 2 and the load sensor 14.

In step 2), the operation interface of the workstation 17 displays and records test data of the specimen test modules 16 in real time respectively.

In step 2), the specimen test modules 16 operate independently, and finish operation at the same time or at different time.

The method further includes a step of:

3) collecting and calculating the test data of the test modules (16), and drawing test process curves.

Compared with the prior art, the present invention has the following beneficial effects:

1. The present invention can be applied to mechanical property tests of of miniature specimens.
2. The specimen size ranges from 1 mm to 60 mm.
3. For miniature specimens, any plural number of tests of tensile, bending, compression bending, stress-rupture, relaxation, fatigue and other mechanical properties can be carried out at the same time, thus providing a solution for exploring a high-throughput test of mechanical properties of materials.
4. By configuring different types of clamp bodies, testing can be carried out on samples of different specifications and types.
5. The specimen test module 16 can be installed either horizontally or vertically.
6. The control system has displacement control, stress control and strain control methods.
7. The test methods and control parameters of each test module can be set individually.
8. The specimen test unit adopts a modular design, which is helpful for users to expand the test unit according to the test needs.

Figure 1A:
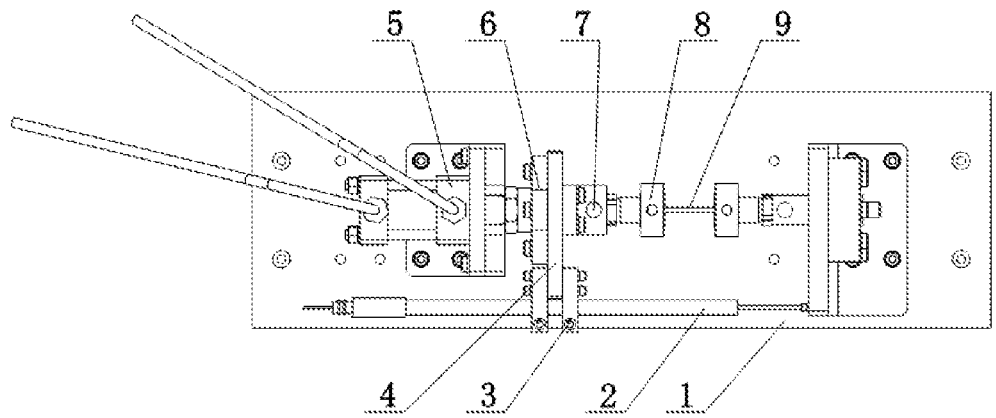
FIG. 1*a* is a schematic diagram of a front-view structure of a specimen test module 16 of the present invention.

| List of reference numerals: | | | |
|---|---|---|---|
| 1 | Base | 2 | Displacement sensor |
| 3 | Displacement sensor fixing plate | 4 | Connecting plate |
| 5 | Drive unit | 6 | Connecting flange |
| 7 | Clamp pin | 8 | Clamp unit |
| 9 | specimen | 10 | Moving end fixing plate |
| 11 | Clamp lock nut | 12 | First clamp connecting rod |
| 13 | Load sensor fixing plate | 14 | load sensor |
| 15 | workbench | 16 | specimen test module |
| 17 | Workstation | 18 | Second clamp connecting rod |

DETAILED DESCRIPTION OF THE EMBODIMENTS

The present invention will be further described in conjunction with the accompanying drawings and embodiments.

A system for a high-throughput test of mechanical properties of miniature specimens of the present invention includes a plurality of specimen test modules 16 installed horizontally or vertically on a workbench 15, and a workstation 17. The power of each specimen test module 16 is derived from the same workstation 17, and the workstation 17 may be a hydraulic station and a control system thereof, or an air pump station and a control system thereof, or a servo drive and a control system thereof.

Figure 1B:
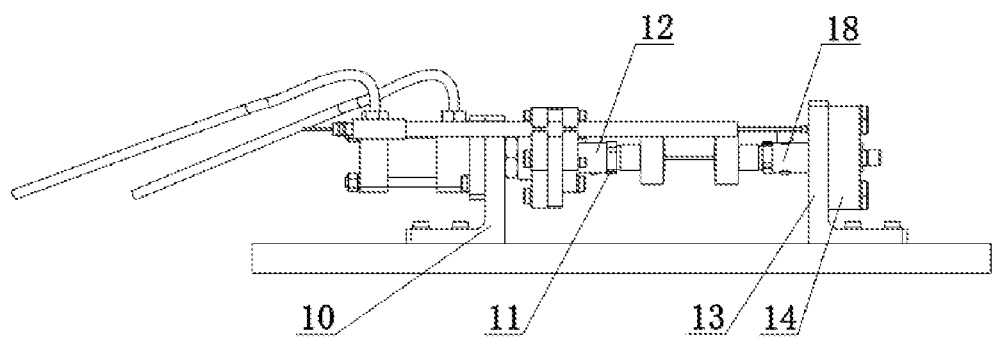
FIG. 1*b* is a structure diagram of a side-view structure of a specimen test module 16 (FIG. 1*a*) of the present invention.

As shown in FIG. 1, the system 6 includes six specimen test modules 16, and each specimen test module 16 can perform tensile, bending, compression bending, stress-rupture, relaxation, and fatigue mechanical property tests. The number of test modules 16 may be increased arbitrarily according to needs. Each specimen test module 16 includes a base 1, a displacement sensor 2, a displacement sensor fixing plate 3, a connecting plate 4, a drive unit 5, a clamp unit 8, a moving end fixing plate 10, a first clamp connecting rod 12, a second clamp connecting rod 18, a load sensor fixing plate 13 and a load sensor 14.

The moving end fixing plate 10 and the load sensor fixing plate 13 are respectively fixed to the base 1 perpendicularly in such a manner of corresponding to each other and being spaced by a distance from each other.

The drive unit 5 is fixedly connected to an outer end face of the moving end fixing plate 10, and a driving rod of the drive unit 5 passes through the moving end fixing plate 10 and is connected to an outer end face of the connecting plate 4 through a connecting flange 6.

The load sensor 14 is fixed to an outer end face of the load sensor fixing plate 13 and is used for detecting the test force during the test.

The first clamp connecting rod 12 is fixedly connected to an inner end face of the connecting plate 4; the second clamp connecting rod 18 passes through the load sensor fixing plate 13 from an inner end face of the load sensor fixing plate 13 and is fixedly fixed to the load sensor 14; and two clamping parts of the clamp unit 8 are respectively installed on the first clamp connecting rod 12 and the second clamp connecting rod 18 through mutual cooperation of a clamp pin 7 and a clamp lock nut 11.

The pair of displacement sensor fixing plates 3 are fixedly connected to the inner end face and the outer end face on one side of the connecting plate 4; and the displacement sensor 2 is installed on the two displacement sensor fixing plates 3 along a moving direction of the driving rod of the drive unit 5, and a detection end of the displacement sensor 2 is in contact with the inner end face of the load sensor fixing plate 13. When the driving rod of the drive unit 5 drives the connecting plate 4 to move, the displacement sensor 2 can detect the moving distance of the connecting plate 4 in real time.

The workstation 17 is connected to the drive unit 5, the displacement sensor 2 and the load sensor 14 of the specimen test module 16 respectively, controls the drive unit 5 and receives detection data of the displacement sensor 2 and the load sensor 14.

Working modes of the drive unit 5 include pneumatic driving, hydraulic driving, and motor driving.

The displacement sensor 2 is a LVDT linear displacement sensor, a pull wire displacement encoder, or an optical displacement sensor.

Clamp body types of the clamp unit 8 include a bar specimen clamp body, a plate specimen clamp body, a three-point bending clamp body and a compression clamp body.

The load sensor 14 is a spoke-type load sensor or an S-type load sensor.

Figure 2A:
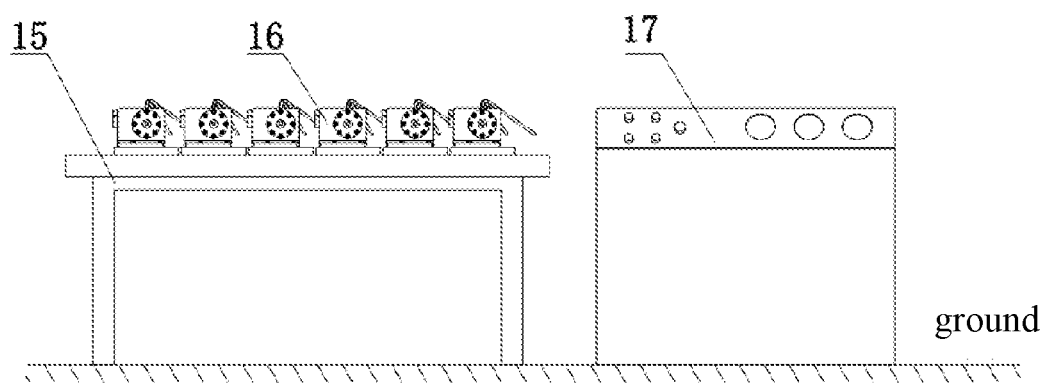
FIG. 2*a* is a schematic diagram of a side view of a system for a high-throughput test of mechanical properties of miniature specimens of the present invention in a horizontal installation state.
Figure 2B:
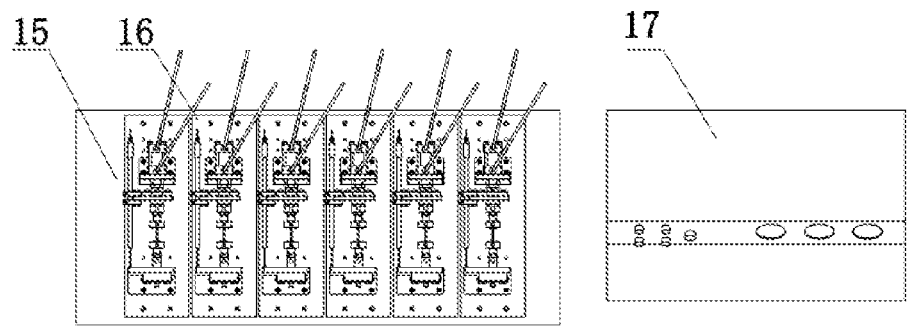
FIG. 2*b* is a schematic diagram of a top view of a system for a high-throughput test of mechanical properties of miniature specimens (FIG. 2*a*) of the present invention in a horizontal installation state.
Figure 3A:
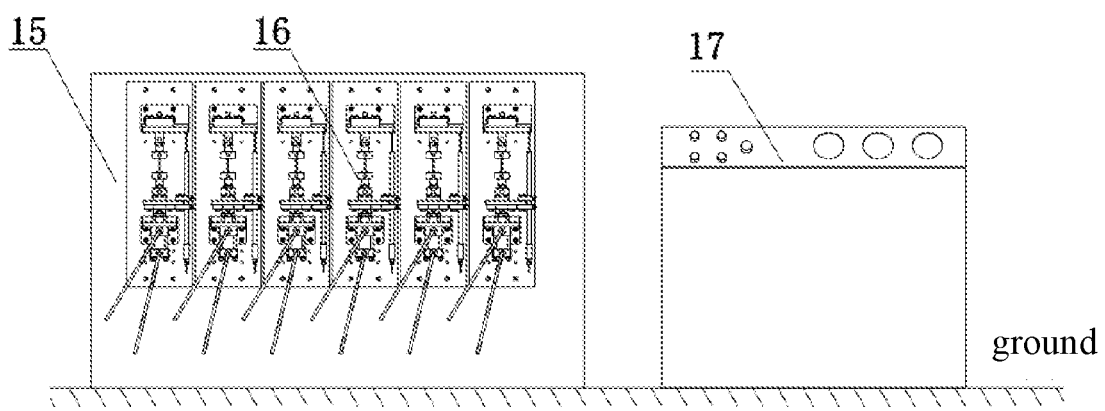
FIG. 3*a* is a schematic diagram of a side view of a system for a high-throughput test of mechanical properties of miniature specimens of the present invention in a vertical installation state.
Figure 3B:
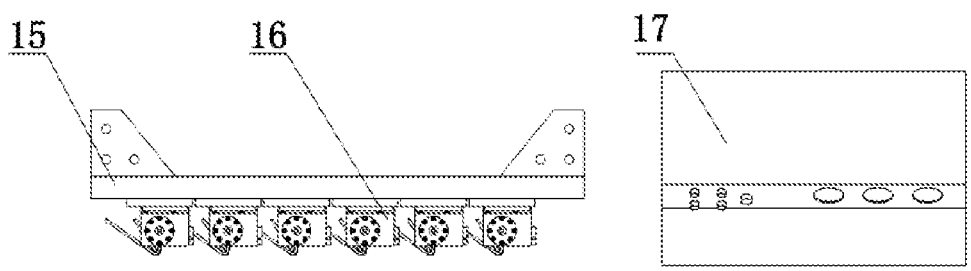
FIG. 3*b* is a schematic diagram of a top view of a system for a high-throughput test of mechanical properties of miniature specimens (FIG. 3*a*) of the present invention in a vertical installation state.

The specimen test module 16 of the present invention is installed and fixed to the workbench 15 through bolted connection, and any plural number of specimen test modules 16 can be installed in parallel on one workbench 15. A plurality of specimen test modules 16 are horizontally installed on the workbench 15 (FIGS. 2a and 2b), and may also be vertically mounted on the workbench 15 (FIGS. 3a and 3b).

When the drive unit 5 of the present invention adopts hydraulic driving, the drive unit 5 is a hydraulic cylinder, and the workstation 17 is a hydraulic station and a control system, and the workstation 17 is connected to the drive unit 5, the displacement sensor 2 and the load sensor 14 of the specimen test module 16, respectively. During the test, the workstation 17 drives the hydraulic cylinder to work, and the hydraulic cylinder drives the connecting plate 4 to move back or forth, and the displacement sensor 2 and the load sensor 14 detect the deformation and a test force value of the specimen 9 in real time, to achieve the tensile or compression test of the specimen.

When the drive unit 5 of the present invention adopts pneumatic driving, the drive unit 5 is air cylinder, and the workstation 17 is an air pump station and a control system, and the workstation 17 is connected to the drive unit 5, the displacement sensor 2 and the load sensor 14 of the specimen test module 16, respectively. During the test, the workstation 17 drives the air cylinder to work, and the air cylinder drives the connecting plate 4 to move back or forth, and the displacement sensor 2 and the load sensor 14 detect the deformation and a test force value of the specimen 9 in real time, to achieve the tensile or compression test of the specimen.

When the drive unit 5 of the present invention adopts motor driving, the drive unit 5 is motor, and the workstation 17 is a control system, and the workstation 17 is connected to the drive unit 5, the displacement sensor 2 and the load sensor 14 of the specimen test module 16, respectively. During the test, the workstation 17 controls the motor to work, and the motor drives the connecting plate 4 to move back or forth, and the displacement sensor 2 and the load sensor 14 detect the deformation and a test force value of the specimen 9 in real time, to achieve the tensile or compression test of the specimen.

The present invention can achieve control of simultaneously started testing of any plural number of specimen test modules 16. During simultaneously started testing of a plurality of specimen test modules 16, after the specimen 9 are installed to the clamp units 8, test method setting is performed on a software operation interface, and then test parameters are assigned to the corresponding test module units, such that the test can be started with one click. During the test, the test process of each specimen 9 and related test parameters and data can be automatically observed and read. When tests of a plurality of specimens 9 are started simultaneously, finish of the test of each specimen does not affect the continuation of the tests of other specimens until the end of all the tests. During and after the test, a corresponding specimen test module 16 can be selected to read a test process curve and obtain a corresponding mechanical property test result.

The working process of the present invention is as follows:

Before testing, suitable clamp units 8 are selected according to the dimension types of specimens 9, and two clamping parts of each clamp unit 8 are respectively installed on the first clamp connecting rod 12 and the second clamp connecting rod 18 through mutual cooperation of a clamp pin 7 and a clamp lock nut 11. Then, each specimen 9 is mounted on the two clamping parts of the clamp unit 8, and the clamp unit 8 is adjusted to a proper position according to the shape and size of the specimen 9.

After the specimens to be tested are installed to the specimen test modules 16, test parameters of the specimen test modules 16 are set on the software operation interface of the workstation 17. After settings of the test parameters are completed, the specimen test modules 16 for testing are selected (only the specimen test modules 16 with the specimen 9 installed thereon for testing are selected), and then after starting by one-click operation, the selected specimen test modules 16 start the test work. During the test, the software operation interface of the workstation 17 displays and records test data of the specimen test modules 16 in real time respectively. In the test, the specimen test modules 16 operate independently and do not influence each other. The finish of a certain test does not influence the progress of other tests until the end of the tests of the test modules, thus achieving mechanical property tests of any plural number of specimens, and providing a solution for exploring a high-throughput test of mechanical properties of materials.

The invention claimed is:

1. A system for a high-throughput test of mechanical properties of miniature specimens, the system comprising one workstation and a plurality of specimen test modules installed horizontally or vertically on a workbench, wherein the workstation comprises an operation interface, a data processing unit and a load output unit; each specimen test module comprises a drive unit, an interchangeable clamp unit, a displacement sensor and a load sensor; the workstation is connected to the drive unit, the displacement sensor and the load sensor of the specimen test module respectively, controls the drive unit and receives detection data of the displacement sensor and the load sensor;

each specimen test module optionally performs mechanical property testing independently, and specimens in the specimen test modules are same or different specimens; and the workstation controls simultaneously started testing of a plurality of specimens.

2. The system for a high-throughput test of mechanical properties of miniature specimens according to claim 1, wherein
the specimen test module further comprises a base, displacement sensor fixing plates, a connecting plate, a moving end fixing plate, a first clamp connecting rod, a second clamp connecting rod and a load sensor fixing plate;
the moving end fixing plate and the load sensor fixing plate are respectively fixed to the base perpendicularly in such a manner of corresponding to each other and being spaced by a distance from each other;
the drive unit is fixedly connected to an outer end face of the moving end fixing plate and a driving rod of the drive unit passes through the moving end fixing plate and is connected to an outer end face of the connecting plate through a connecting flange;
the load sensor is fixedly connected to an outer end face of the load sensor fixing plate;
the first clamp connecting rod is fixedly connected to an inner end face of the connecting plate; the second clamp connecting rod passes through the load sensor fixing plate from an inner end face of the load sensor fixing plate and is fixedly fixed to the load sensor; two clamping parts of the clamp unit are respectively mounted on the first clamp connecting rod and the second clamp connecting rod;
a pair of displacement sensor fixing plates are fixedly connected to the inner end face and the outer end face on one side of the connecting plate; and the displacement sensor is installed on the two displacement sensor fixing plates along a moving direction of the driving rod of the drive unit, and a detection end of the displacement sensor is in contact with the inner end face of the load sensor fixing plate.

3. The system for a high-throughput test of mechanical properties of miniature specimens according to claim 1, wherein mechanical properties to be tested by each test module are selected and/or input through the operation interface of the workstation.

4. The system for a high-throughput test of mechanical properties of miniature specimens according to claim 1, wherein the mechanical property test is one or more selected from tensile, bending, compression bending, stress-rupture, relaxation, and fatigue tests.

5. The system for a high-throughput test of mechanical properties of miniature specimens according to claim 1, wherein working modes of the drive unit comprise pneumatic driving, hydraulic driving, and motor driving.

6. The system for a high-throughput test of mechanical properties of miniature specimens according to claim 1, wherein the displacement sensor is a LVDT linear displacement sensor, a pull wire displacement encoder, or an optical displacement sensor.

7. The system for a high-throughput test of mechanical properties of miniature specimens according to claim 1, wherein clamp body types of the clamp unit comprise a bar specimen clamp body, a plate specimen clamp body, a three-point bending clamp body and a compression clamp body.

8. The system for a high-throughput test of mechanical properties of miniature specimens according to claim 1, wherein the load sensor is a spoke-type load sensor or an S-type load sensor.

9. The system for a high-throughput test of mechanical properties of miniature specimens according to claim 1, wherein two clamping parts of the clamp unit are respectively installed on the first clamp connecting rod and the second clamp connecting rod through mutual cooperation of a clamp pin and a clamp lock nut.

10. The system for a high-throughput test of mechanical properties of miniature specimens according to claim 1, wherein the power of each specimen test module is derived from the same workstation and the load output unit of the workstation is one or more selected from a hydraulic station and a control system thereof, an air pump station and a control system thereof, and a servo drive and a control system thereof.

11. The system for a high-throughput test of mechanical properties of miniature specimens according to claim 10, wherein various control systems in the load output unit of the workstation can achieve displacement control, stress control and strain control.

12. The system for a high-throughput test of mechanical properties of miniature specimens according to claim 1, wherein the specimen size ranges from 1 mm to 60 mm.

13. The test method using the system for a high-throughput test of mechanical properties of miniature specimens according to claim 1, wherein, the method comprising steps of:
1) based on the sizes of a plurality of specimens and mechanical properties to be tested, selecting clamp units respectively therefor, and fixing the specimens to the clamp units respectively; and
2) installing the plurality of clamp units on a plurality of specimen test modules, and inputting mechanical properties to be tested and test parameters of each specimen test module from the operation interface of the workstation and the workstation controlling simultaneously started testing of the plurality of specimens, controlling the drive units of the specimen test modules, and receiving detection data of the displacement sensor and the load sensor.

14. The test method according to claim 13, wherein in step 2), the operation interface of the workstation displays and records test data of the specimen test modules in real time respectively.

15. The test method according to claim 13, wherein in step 2), the specimen test modules operate independently, and finish operation at the same time or at different time.

16. The test method of claim 13, further comprising a step of:
3) collecting and calculating the test data of the test modules, and drawing test process curves.

* * * * *